United States Patent
Kang

(10) Patent No.: US 7,644,481 B2
(45) Date of Patent: Jan. 12, 2010

(54) BEARING POSITIONING TOOL SET

(76) Inventor: Hsin-Fa Kang, 235 Chung - Ho, Box 8-24, Taipei (TW)

( * ) Notice: Subject to any disclaimer, the term of this patent is extended or adjusted under 35 U.S.C. 154(b) by 0 days.

(21) Appl. No.: 12/174,620

(22) Filed: Jul. 16, 2008

(65) Prior Publication Data
US 2008/0282525 A1 Nov. 20, 2008

Related U.S. Application Data

(63) Continuation-in-part of application No. 11/540,558, filed on Oct. 2, 2006.

(51) Int. Cl.
*B23P 19/04* (2006.01)
(52) U.S. Cl. .............................. 29/271; 29/255; 29/263; 29/280
(58) Field of Classification Search .................. 29/271, 29/229, 235, 275, 255, 263
See application file for complete search history.

(56) References Cited

U.S. PATENT DOCUMENTS

| | | | | |
|---|---|---|---|---|
| 6,148,493 A * | 11/2000 | Pixley et al. | ................... | 29/275 |
| 6,886,228 B1 * | 5/2005 | Chen | ........................... | 29/263 |
| 7,096,550 B2 * | 8/2006 | Klann | ......................... | 29/227 |
| 7,478,464 B2 * | 1/2009 | Kang | ......................... | 29/255 |
| 2008/0080095 A1 * | 4/2008 | Kang | ...................... | 360/244.3 |
| 2008/0282525 A1 * | 11/2008 | Kang | ......................... | 29/271 |

* cited by examiner

*Primary Examiner*—Lee D Wilson

(57) ABSTRACT

A bearing-positioning tool set comprises a grip having an inner end fixed with a combining rod extending outward, the combining rod bored with a combining threaded hole; at least one positioning press blocks respectively formed with two different diameters the positioning press blocks to be fitted with the grip respectively bored with an insert hole in the center, each of two ends of the insert hole being formed with a groove; each the positioning press block formed with a first circular fitting member, a first circular holding edge, a second circular fitting member and a second circular holding edge; and a combining member threadably combined with the combining threaded hole of the grip for fixing the positioning press block in position; one end of the combining member being formed with an enlarged head.

1 Claim, 6 Drawing Sheets

US 7,644,481 B2

BEARING POSITIONING TOOL SET

The present invention is a continuation in part of U.S. patent application Ser. No. 11/540,558 filed Oct. 2, 2006 which is assigned to and invented by the inventor and applicant of the present invention. Thus, the content of U.S. patent application Ser. No. 11/540,558 is incorporated into the present invention as a part of the present invention.

BACKGROUND OF THE INVENTION

1. Field of the Invention

This invention relates to a bearing positioning tool set, particularly provided with positioning press blocks able to contact closely and smoothly with the upper inner edge of a bearing so that hammering force can be applied evenly to enable the bearing to be smoothly and quickly assembled and positioned in the insert hole of an axle. The tool set of this invention consists of a plurality of different-sized positioning press blocks respectively formed with two different diameters in order to match with different-sized bearings.

2. Description of the Prior Art

As commonly known, a bearing is an essential machine part for positioning an axle and reducing wear of the axle, so a bearing is one of the most important transmission machine parts. As illustrated in FIG. 1, a bearing positioning tool set with application Ser. No. 11/540,558 is disclosed by the inventor of the present invention, in that a bearing positioning tool set in the present invention includes a grip 1, one or more positioning press blocks 2, and a combining member 3 combined together. The grip 1 has an inner end fixed with a combining rod 10 extending outward and having a combining threaded hole 11 and an outer end formed with a hammering end. The positioning press blocks 2 to be fitted with the grip 1 are respectively formed with different diameters and bored with an insert hole 20 in the center. Further, each positioning press block 2 is formed with a first fitting circular member 21, a first circular holding edge 22, a second circular fitting member 23 and a second circular holding edge 24. The combining member 3 is to be threadably combined with the combining hole 11 of the grip 1 for fixing the positioning press block 2 in position. A inner wall B10 and a top end B11 of a bearing B will adhere to the member 21 (or 23) and the first circular holding edge 22 (or 23) so that a knock force can be performed uniformly so that the bearing can be assembled to the through hole A of a wheel axle.

However in this prior art, after combination of the combining member 3 and the grip 1, open end thereof will protrude out of a bottom of the positioning press block 2. When object the bearing B, the protruding portion of the combining member 3 is easy to damage a workpiece D.

SUMMARY OF THE INVENTION

A first objective of this invention is to offer a bearing positioning tool set able to smoothly and quickly assemble and position a bearing in the insert hole of an axle.

A second objective of this invention is to offer a bearing positioning tool set able to have a positioning press block smoothly and closely contacting with the upper inner edge of a bearing so that hammering force can be applied evenly and the bearing, during assembling, can be kept smooth not to slant on one side, able to avoid wear to the inner wall of the insert hole of an axle and prevent the bearing from being damaged due to improper hammering.

A third objective of this invention is to offer a bearing positioning tool set, which is provided with various positioning press blocks with different sizes, and each positioning press block is formed with two different diameters for matching with different-sized bearings.

A fourth objective of this invention is to offer a bearing positioning tool set, which is provided with a tool box for facilitating depositing and storing members of the tool set.

To achieve above object, the present invention provides a bearing-positioning tool set comprises a grip having an inner end fixed with a combining rod extending outward, said combining rod bored with a combining threaded hole; at least one positioning press blocks respectively formed with two different diameters, said positioning press blocks to be fitted with said grip respectively bored with an insert hole in the center, each of two ends of the insert hole being formed with a groove; each said positioning press block formed with a first circular fitting member, a first circular holding edge, a second circular fitting member and a second circular holding edge; and a combining member threadably combined with said combining threaded hole of said grip for fixing said positioning press block in position; one end of the combining member being formed with an enlarged head which can be received in the groove of the positioning press block.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
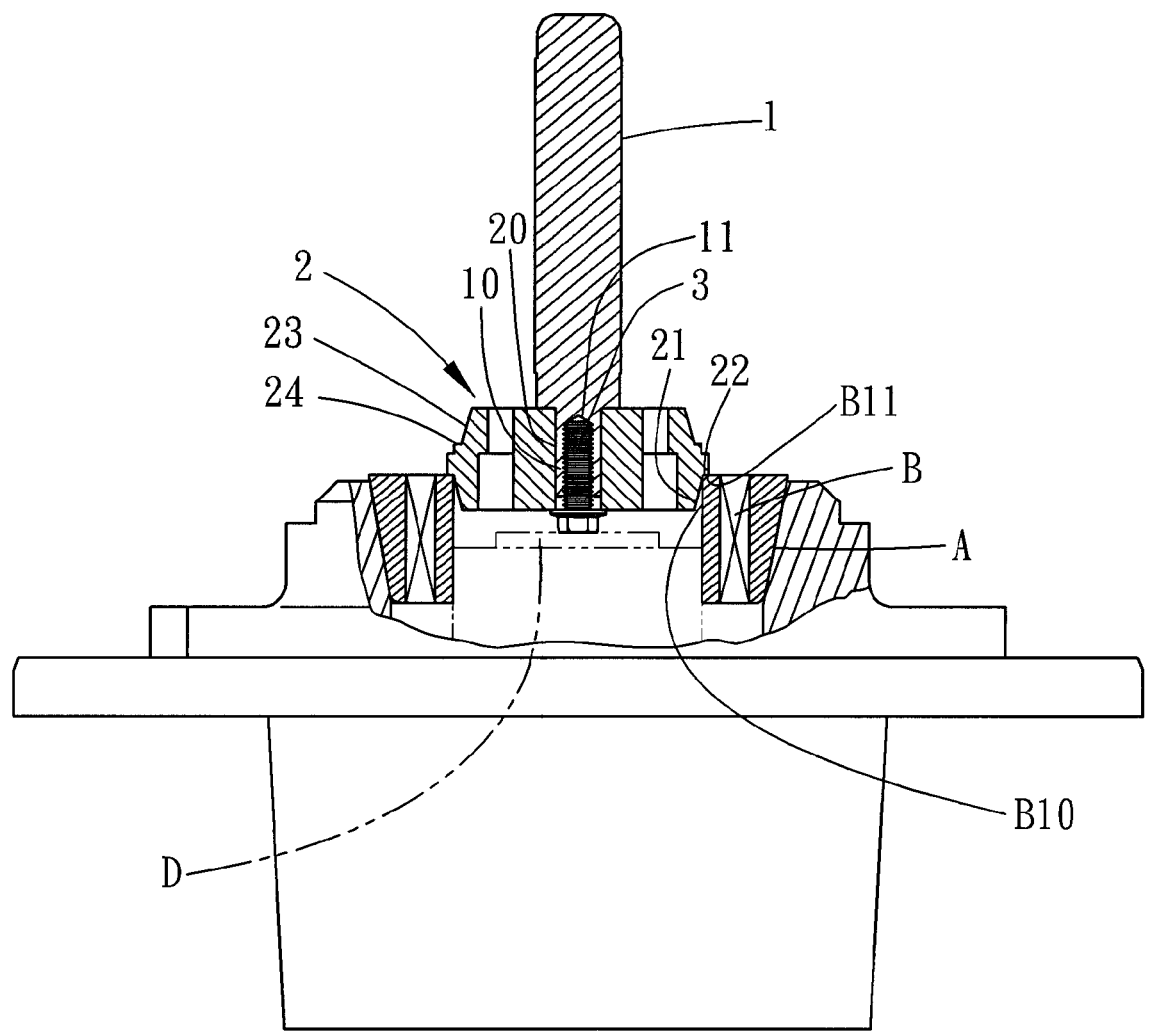
FIG. 1 is a perspective view of a bearing hammered to be assembled in the insert hole of an axle in a conventional way.
Figure 2:
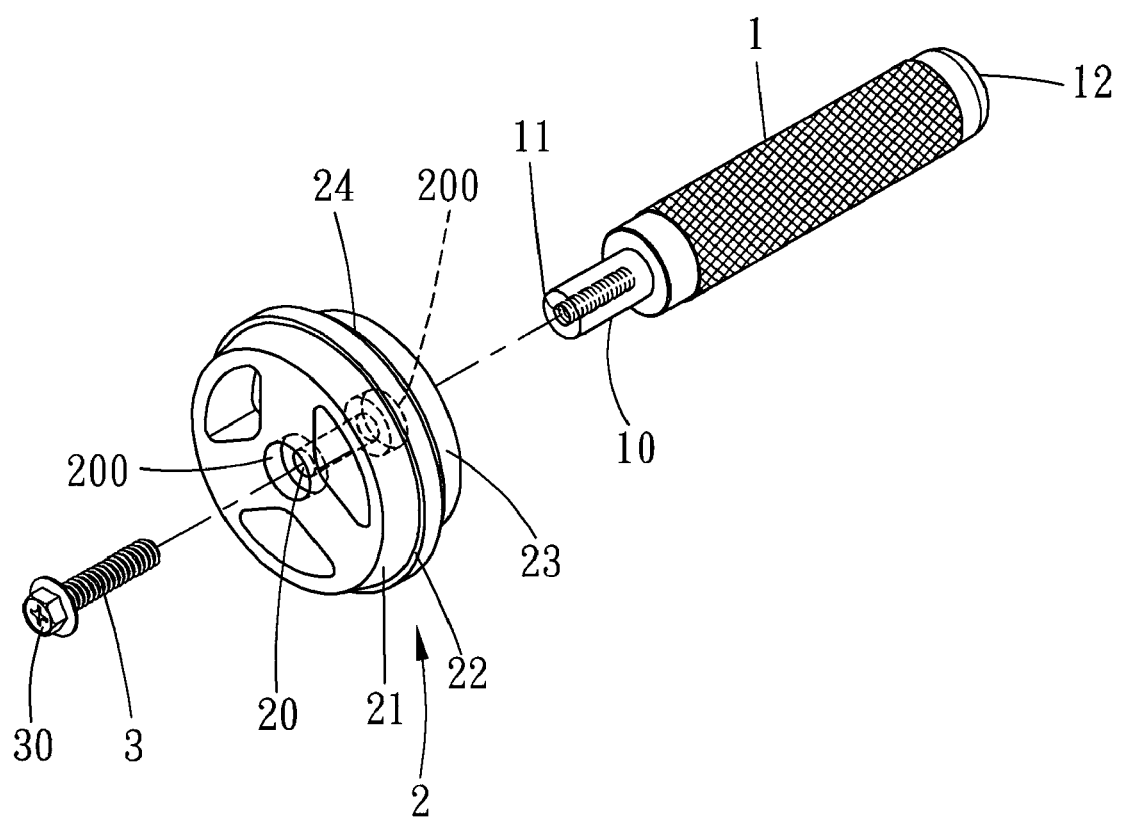
FIG. 2 is an exploded perspective view of a bearing-positioning tool set in the present invention.
Figure 3:
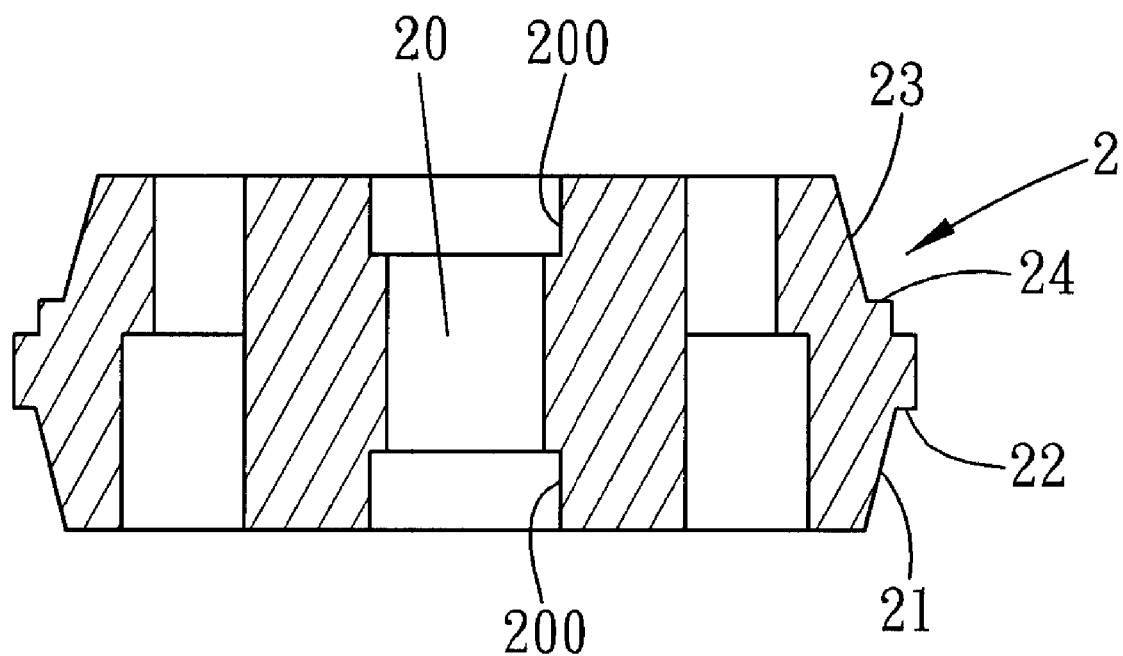
FIG. 3 is a cross-sectional view of a positioning press block in the present invention.
Figure 6:
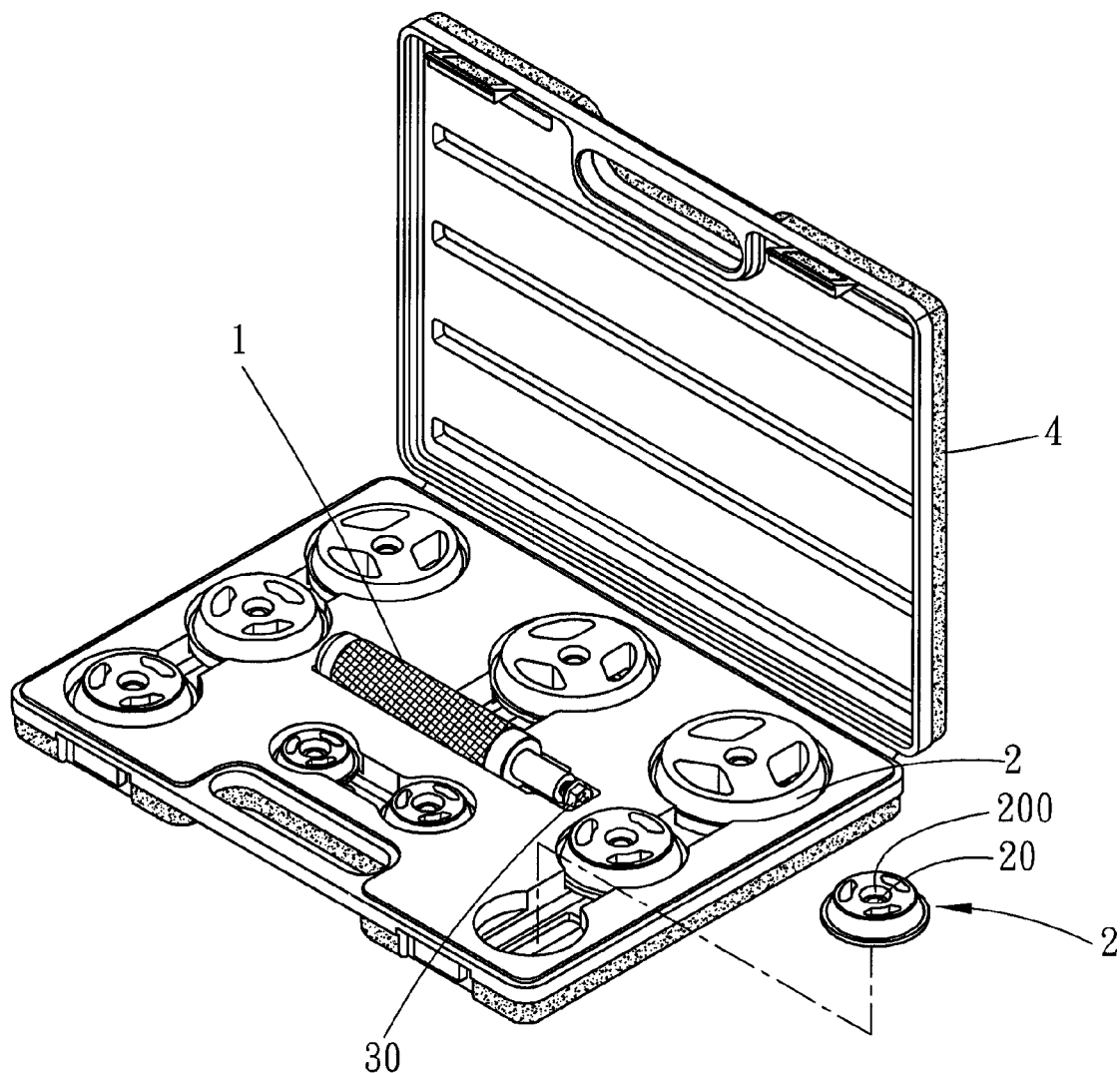
FIG. 6 is a perspective view of a toolbox for depositing and storing the members of the tool set in the present invention.

A preferred embodiment of a bearing positioning tool set in the present invention, as shown in FIGS. 2, 3 and 6, includes a grip 1, one or more positioning press blocks 2, a combining member 3 and a tool box 4 combined together.

The grip 1 has an inner end fixed with a combining rod 10 extending outward and having a combining threaded hole 11 and an outer end formed with a hammering end 12.

At least one positioning press blocks 2 to be fitted with the grip 1 are respectively formed with different diameters and bored with an insert hole 20 in the center. Each of two ends of the insert hole 20 is formed with a groove 200. Further, each positioning press block 2 is formed with a first fitting circular member 21, a first circular holding edge 22, a second circular fitting member 23 and a second circular holding edge 24.

The combining member 3 is to be threadably combined with the combining hole 11 of the grip 1 for fixing the positioning press block 2 in position. The combining member 3 has a threaded rod and one end thereof is installed with a head 30 which can be received in the groove 200 of the positioning press block 2.

The tool box 4 is used for depositing and storing the above-mentioned members of the tool set.

Figure 4:
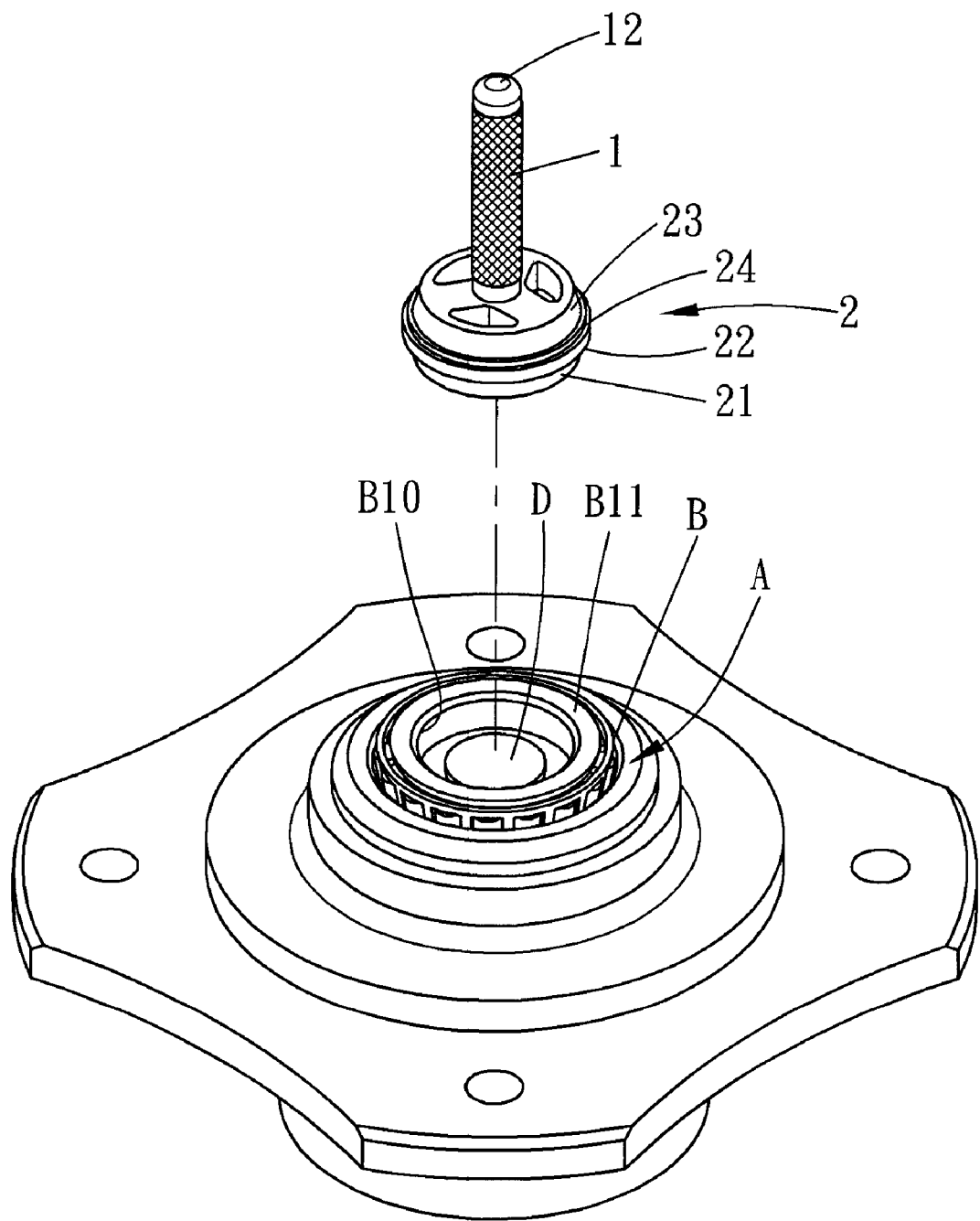
FIG. 4 is a perspective view of the tool set to be hammered for positioning a bearing in the insert hole of an axle in the present invention.
Figure 5:
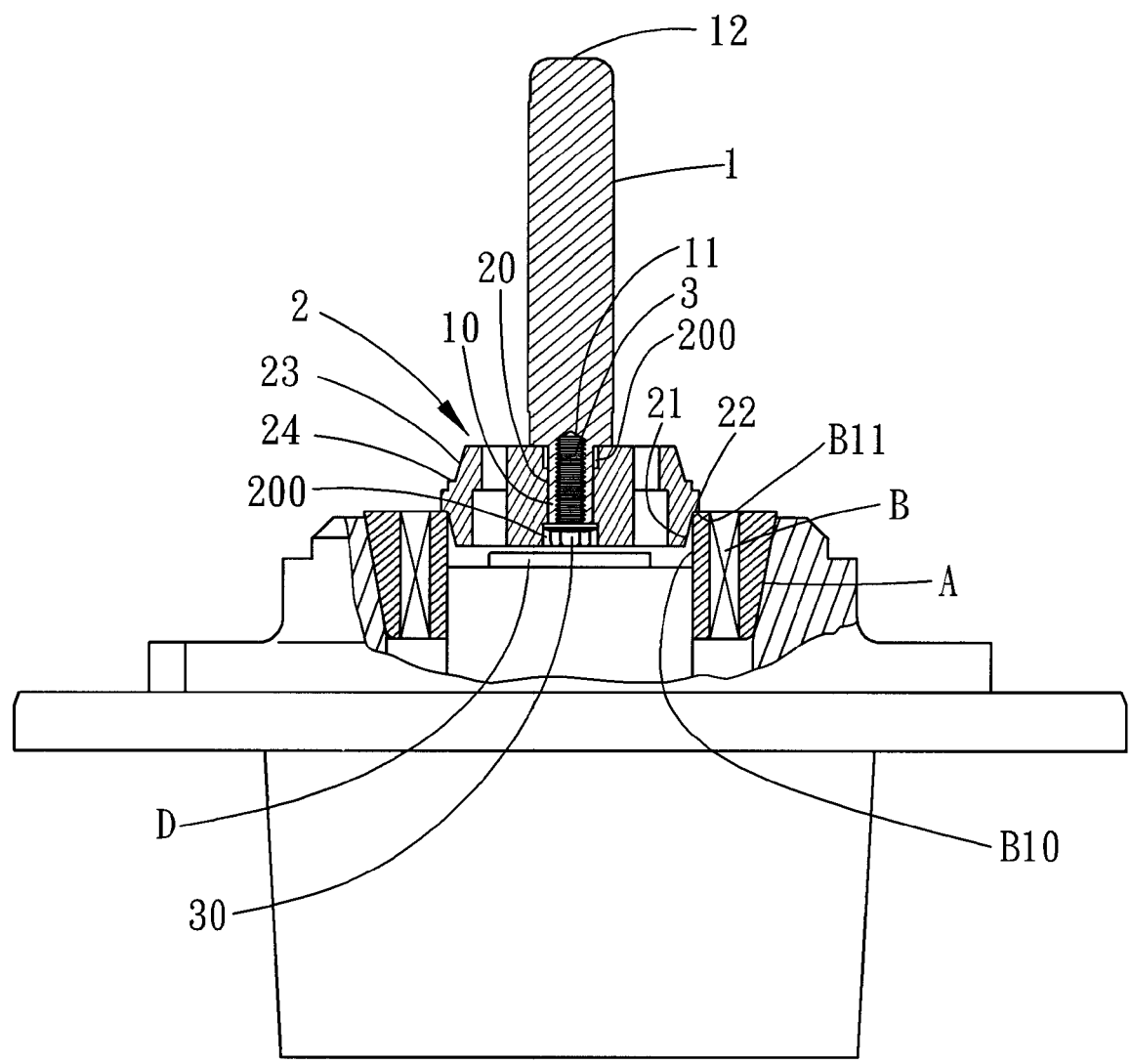
FIG. 5 is a cross-sectional view of the tool set hammered to position the bearing in the insert hole of the axle in the present invention.

In using, as shown in FIGS. 2-5, firstly, pick out a positioning press block 2 with a suitable diameter and circumference according to the size of the inner diameter of a bearing (B) to be assembled. Next, the combining rod 10 of the grip 1 is inserted through the central insert hole 20 of the positioning press block 2 and then the combining member 3 is threadably combined with the combining threaded hole 11 of the grip 1 to fix the positioning press block 2 in position. The head 30 of the combining member 30 is exactly received in the groove 200 of the insert hole 20. In operating for positioning the bearing (B), as shown in FIGS. 4 and 5, firstly, the positioning press block 2 has its first fitting member 21 (or the second fitting member 23) closely contacting with the inner wall (B10) of the bearing (B) and its first holding edge 22 (or the second holding edge 24) closely and horizontally resting on the upper edge (B11) of the bearing (B). Next, the bearing (B) is driven into the insert hole (A) of an axle by striking the hammering end 12 of the grip 1. The head 30 of the combining member 30 is exactly received in the groove 200 of the insert hole 20 so as to avoid the head 30 of the combining member 3 to damage the workpiece (D). Moreover, the bottom of the positioning press block 2 is retained in a flat state and the positioning operation of the bearing (B) is steadily and easily.

While the preferred embodiment of the invention has been described above, it will be recognized and understood that various modifications may be made therein and the appended claims are intended to cover all such modifications that may fall within the spirit and scope of the invention.

What is claimed is:

1. A bearing-positioning tool set comprising:
   a grip (1) having a combining rod (10) and a hamming end (12); the combining rod (10) extending from a front end thereof; the combining rod (10) having a threaded hole (11) and the hamming end (12) extending from a rear end thereof;
   a positioning press block (2) for retaining the grip (1); the positioning press block (2) having an insert hole (20) in a center thereof;
   each of two ends of the insert hole (20) being formed with an enlarged groove (200); the positioning press block (2) being formed with a first fitting circular member (21) having a tilt outer surface, a first circular holding edge (22) behind the first fitting circular member (21), a second circular holding edge (24) being the second circular holding edge (22); and
   a second circular fitting member (23); an outer diameter of the second circular edge (22) being greater than those of the first fitting circular member (21), the second circular holding edge (24) and the second circular fitting member (23); at least one through hole being formed in the first circular fitting member (21) and being around the insert hole (20); and the positioning press block (2) having three through holes arranged around the enlarged groove (200);
   a combining member (3) to be threadably combined with the combining hole (11) of the grip (1) for fixing the positioning press block (2) in position; the combining member (3) having a threaded rod and one end thereof being installed with a head (30) which can be received in the groove (200) of the positioning press block (2).

* * * * *